United States Patent
Lee

(10) Patent No.: US 8,612,613 B2
(45) Date of Patent: Dec. 17, 2013

(54) METHOD FOR SETTING PLURALITY OF SESSIONS AND NODE USING SAME

(75) Inventor: Seok Chan Lee, Seoul (KR)

(73) Assignee: CDNetworks Co., Ltd., Seoul (KR)

( * ) Notice: Subject to any disclaimer, the term of this patent is extended or adjusted under 35 U.S.C. 154(b) by 76 days.

(21) Appl. No.: 13/395,211

(22) PCT Filed: Sep. 10, 2010

(86) PCT No.: PCT/KR2010/006190
§ 371 (c)(1),
(2), (4) Date: Jun. 1, 2012

(87) PCT Pub. No.: WO2011/031097
PCT Pub. Date: Mar. 17, 2011

(65) Prior Publication Data
US 2012/0246329 A1  Sep. 27, 2012

(30) Foreign Application Priority Data
Sep. 11, 2009  (KR) .................. 10-2009-0085962

(51) Int. Cl.
*G06F 15/16* (2006.01)

(52) U.S. Cl.
USPC ................ 709/228; 709/224; 709/227

(58) Field of Classification Search
USPC .............. 709/200–203, 217–228, 229
See application file for complete search history.

(56) References Cited

U.S. PATENT DOCUMENTS

| | | | | |
|---|---|---|---|---|
| 6,460,087 B1 * | 10/2002 | Saito et al. | ...... | 709/236 |
| 7,092,982 B2 * | 8/2006 | Fujiwara et al. | ...... | 709/200 |
| 7,765,307 B1 * | 7/2010 | Kritov et al. | ...... | 709/228 |
| 8,195,830 B2 * | 6/2012 | Tian | ...... | 709/233 |
| 2002/0002616 A1 | 1/2002 | Lim | | |

FOREIGN PATENT DOCUMENTS

| KR | 10-2001-0066369 A | 7/2001 |
|---|---|---|
| KR | 10-2005-0023468 A | 3/2005 |

OTHER PUBLICATIONS

PCT International Search Report, PCT/KR2010/006190, Jun. 20, 2011, 5 Pages.

* cited by examiner

*Primary Examiner* — Moustafa M Meky
(74) *Attorney, Agent, or Firm* — Fenwick & West LLP

(57) ABSTRACT

Disclosed are a method for setting a plurality of sessions and a method for transmitting/receiving data using the same. According to an exemplary embodiment of the present invention, at least some of the data including attribute information of the data are received through initial sessions, the number of additional sessions for receiving the data is calculated by using the attribute information of the data, and the additional sessions are set as many as the calculated number of additional sessions. According to the exemplary embodiments of the present invention, various and complicated states of the communication network can be reflected to session setting as the configuration of the communication network becomes more and more complicated and the sessions depending on the state of the communication network can be set, thereby transmitting data more effectively.

12 Claims, 3 Drawing Sheets

METHOD FOR SETTING PLURALITY OF SESSIONS AND NODE USING SAME

TECHNICAL FIELD

The present invention relates to a method for setting a plurality of sessions and a node using the same, and more particularly, to a method for setting a plurality of sessions between nodes when data is transmitted/received through a communication network and a node capable of transmitting/receiving data by using the set sessions.

BACKGROUND ART

In recent years, with the development of a digital processing apparatus such as a computer and the development of a communication network, a large quantity of data have been transmitted and received through the communication network.

The communication network is configured by connecting numerous apparatuses and communication lines with each other and when data is transmitted/received through the communication network, it is important how rapidly and accurately data is transmitted from a transmitting apparatus transmitting data to a receiving apparatus receiving data.

The data transmission is performed through a session which is a connection between nodes.

The node as a connection point on a network represents a redistribution point or an end point of data transmission/reception and may correspond to various apparatuses such as various servers, hubs, routers, switches, and clients that are provided on the network.

Meanwhile, a session as a connection through which various pieces of information is transmitted and received, which is required to transmit/receive data is required between a transmission node transmitting data and a reception node receiving data and as the session, one session is generally set, but a plurality of sessions may be set as necessary.

In the session setting of the related art, the session was just set according to the preset number of sessions between the transmission node and the reception node.

However, as a configuration of the communication network is complicated, a node receiving data transmits data to another node again in most cases and thus, in this case, data cannot be transmitted/received more effectively by using the session setting method in the related art.

Accordingly, a method for setting sessions and a method for transmitting/receiving data using the same that can reflect various and complicated states of the communication network are required as the configuration of the communication network is more and more complicated.

SUMMARY OF THE INVENTION

The present invention has been made in an effort to provide a method for setting sessions and a method for transmitting/receiving data using the same that can reflect various and complicated states of the communication network as the configuration of the communication network is more and more complicated.

Further, the present invention has been made in an effort to provide a method for setting sessions and a method for transmitting/receiving data using the same that can set the sessions depending on the state of the communication network more effectively.

Other objects of the present invention will be able to be easily understood by exemplary embodiments to be described below.

An aspect of the present invention provides a method for setting sessions.

An exemplary embodiment of the present invention provides a method for setting sessions, which is performed by a reception node on a network including a transmission node transmitting data and the reception node receiving the data, including: receiving at least some of the data including attribute information of the data through initial sessions; calculating the number of additional sessions for receiving the data by using the attribute information of the data; and setting additional sessions as many as the calculated number of additional sessions.

The attribute information of the data may be at least one of the size of the data, a file type of the data, and a service method of the data.

The calculating of the number of additional sessions for receiving the data may be performed by further using at least one of usable transmission/reception bandwidth of the transmission node and the reception node and transmission/reception quality.

The reception node may receive the data from a plurality of transmission nodes, and the calculating of the number of additional sessions for receiving the data may be performed by further using data transmission information between the plurality of transmission nodes and the reception node.

Another exemplary embodiment of the present invention provides a method for setting sessions, which is performed by a transmission node on a network including the transmission node transmitting data and a reception node receiving the data, including: setting initial sessions with the reception node; calculating the number of additional sessions for transmitting the data by using attribute information of the data to be transmitted to the reception node; and setting additional sessions as many as the calculated number of additional sessions.

The attribute information of the data may be at least one of the size of the data, a file type of the data, and a service method of the data.

The calculating of the number of additional sessions for transmitting the data may be performed by further using at least one of usable transmission/reception bandwidth of the transmission node and the reception node and transmission/reception quality.

The reception node may receive the data from a plurality of transmission nodes, and the calculating of the number of additional sessions for transmitting the data may be performed by further using data transmission information between the plurality of transmission nodes and the reception node.

Yet another exemplary embodiment of the present invention provides a method for setting sessions, which is performed by a reception node on a network including a transmission node transmitting data, the reception node receiving the data, and a third node to which the reception node will transmit the data, including: receiving at least some of the data through initial sessions; calculating the number of additional sessions for receiving the data from the transmission node by using a transmission rate from the reception node to the third node; and setting additional sessions as many as the calculated number of additional sessions.

The calculating of the number of additional sessions for receiving the data may be performed by further using at least one of usable transmission/reception bandwidth of the reception node and the third node, transmission/reception quality, and attribute information of the data.

The reception node may receive the data from a plurality of transmission nodes, and the calculating of the number of additional sessions for receiving the data may be performed by further using data transmission information between the plurality of transmission nodes and the reception node.

Still another exemplary embodiment of the present invention provides a method for setting sessions, which is performed by a transmission node on a network including the transmission node transmitting data, a reception node receiving the data, and a third node to which the reception node will transmit the data, including: setting initial sessions with the reception node; calculating the number of additional sessions for receiving the data by using a transmission rate from the reception node to the third node; and setting additional sessions as many as the calculated number of additional sessions.

The calculating of the number of additional sessions for receiving the data may be performed by further using at least one of usable transmission/reception bandwidth of the reception node and the third node, transmission/reception quality, and attribute information of the data.

The reception node may receive the data from a plurality of transmission nodes, and the calculating of the number of additional sessions for receiving the data may be performed by further using data transmission information between the plurality of transmission nodes and the reception node.

Another aspect of the present invention provides a transmission/reception node.

An exemplary embodiment of the present invention provides a reception node on a network constituted by a plurality of nodes including a transmission node transmitting data and a reception node receiving the data, including: a session setting unit setting sessions with the transmission node; and a data transmitting/receiving unit transmitting/receiving data through the session set by the session setting unit, wherein the data transmitting/receiving unit receives at least some of the data including attribute information of the data through initial sessions set by the session setting unit, the reception node further includes an additional session calculating unit calculating the number of additional sessions for receiving the data by using the attribute information of the data received by the data transmitting/receiving unit, and the session setting unit sets additional sessions with the transmission node as many as the number of additional sessions, which is calculated by the additional session calculating unit.

The attribute information of the data may be at least one of the size of the data, a file type of the data, and a service method of the data.

The calculating of the number of additional sessions for receiving the data in the additional session calculating unit may be performed by further using at least one of usable transmission/reception bandwidth of the transmission node and the reception node and transmission/reception quality.

The reception node may receive the data from a plurality of transmission nodes, and the calculating of the number of additional sessions for receiving the data in the additional session calculating unit may be performed by further using data transmission information between the plurality of transmission nodes and the reception node.

Another exemplary embodiment of the present invention provides a transmission node on a network constituted by a plurality of nodes including the transmission node transmitting data and a reception node receiving the data, including: a session setting unit setting sessions with the reception node; and a data transmitting/receiving unit transmitting/receiving data through the session set by the session setting unit, wherein the transmission node further includes an additional session calculating unit calculating the number of additional sessions for transmitting the data by using the attribute information of the data transmitted by the data transmitting/receiving unit, and the session setting unit sets additional sessions with the reception node as many as the number of additional sessions, which is calculated by the additional session calculating unit.

The attribute information of the data may be at least one of the size of the data, a file type of the data, and a service method of the data.

The calculating of the number of additional sessions for transmitting the data in the additional session calculating unit may be performed by further using at least one of usable transmission/reception bandwidth of the transmission node and the reception node and transmission/reception quality.

The reception node may receive the data from a plurality of transmission nodes, and the calculating of the number of additional sessions for transmitting the data in the additional session calculating unit may be performed by further using data transmission information between the plurality of transmission nodes and the reception node.

Yet another exemplary embodiment of the present invention provides a reception node on a network including a transmission node transmitting data, the reception node receiving the data, and a third node to which the reception node will transmit the data, including: a session setting unit setting sessions with the transmission node; and a data transmitting/receiving unit transmitting/receiving data through the session set by the session setting unit, wherein the data transmitting/receiving unit receives at least some of the data through initial sessions, the reception node further includes an additional session calculating unit calculating the number of additional sessions for receiving the rest of the data from the transmission node by using a transmission rate to the third node, and the session setting unit sets additional sessions with the transmission node as many as the number of additional sessions, which is calculated by the additional session calculating unit.

The calculating of the number of additional sessions for receiving the data in the additional session calculating unit may be performed by further using at least one of usable transmission/reception bandwidth of the reception node and the third node, transmission/reception quality, and attribute information of the data.

The reception node may receive the data from a plurality of transmission nodes, and the calculating of the number of additional sessions for receiving the data in the additional session calculating unit may be performed by further using data transmission information between the plurality of transmission nodes and the reception node.

Still another exemplary embodiment of the present invention provides a transmission node on a network including the transmission node transmitting data, a reception node receiving the data, and a third node to which the reception node will transmit the data, including: a session setting unit setting sessions with the reception node; and a data transmitting/receiving unit transmitting/receiving data through the session set by the session setting unit, wherein the transmission node further includes an additional session calculating unit calculating the number of additional sessions for transmitting the rest of the data by using a transmission rate from the reception node to the third node, and the session setting unit sets additional sessions with the reception node as many as the number of additional sessions, which is calculated by the additional session calculating unit.

The calculating of the number of additional sessions for transmitting the data in the additional session calculating unit may be performed by further using at least one of usable transmission/reception bandwidth of the reception node and the third node, transmission/reception quality, and attribute information of the data.

The reception node may receive the data from a plurality of transmission nodes, and the calculating of the number of additional sessions for transmitting the data in the additional session calculating unit may be performed by further using data transmission information between the plurality of transmission nodes and the reception node.

Yet another aspect of the present invention provides a recording medium storing a program for implementing a method for setting sessions.

An exemplary embodiment of the present invention provides a recording medium storing a program for implementing a method for setting sessions, which is performed by a reception node on a network including a transmission node transmitting data and the reception node receiving the data, wherein the method includes: receiving at least some of the data including attribute information of the data through initial sessions; calculating the number of additional sessions for receiving the data by using the attribute information of the data; and setting additional sessions as many as the calculated number of additional sessions.

The attribute information of the data may be at least one of the size of the data, a file type of the data, and a service method of the data.

The calculating of the number of additional sessions for receiving the data may be performed by further using at least one of usable transmission/reception bandwidth of the transmission node and the reception node and transmission/reception quality.

The reception node may receive the data from a plurality of transmission nodes, and the calculating of the number of additional sessions for receiving the data may be performed by further using data transmission information between the plurality of transmission nodes and the reception node.

Another exemplary embodiment of the present invention provides a recording medium storing a program for implementing a method for setting sessions, which is performed by a transmission node on a network including the transmission node transmitting data and a reception node receiving the data, wherein the method includes: setting initial sessions with the reception node; calculating the number of additional sessions for transmitting the data by using attribute information of the data to be transmitted to the reception node; and setting additional sessions as many as the calculated number of additional sessions.

The attribute information of the data may be at least one of the size of the data, a file type of the data, and a service method of the data.

The calculating of the number of additional sessions for transmitting the data may be performed by further using at least one of usable transmission/reception bandwidth of the transmission node and the reception node and transmission/reception quality.

The reception node may receive the data from a plurality of transmission nodes, and the calculating of the number of additional sessions for transmitting the data may be performed by further using data transmission information between the plurality of transmission nodes and the reception node.

Yet another exemplary embodiment of the present invention provides a recording medium storing a program for implementing a method for setting sessions, which is performed by a reception node on a network including a transmission node transmitting data, the reception node receiving the data, and a third node to which the reception node will transmit the data, wherein the method includes: receiving at least some of the data through initial sessions; calculating the number of additional sessions for receiving the data from the transmission node by using a transmission rate from the reception node to the third node; and setting additional sessions as many as the calculated number of additional sessions.

The calculating of the number of additional sessions for receiving the data may be performed by further using at least one of usable transmission/reception bandwidth of the reception node and the third node, transmission/reception quality, and attribute information of the data.

The reception node may receive the data from a plurality of transmission nodes, and the calculating of the number of additional sessions for receiving the data may be performed by further using data transmission information between the plurality of transmission nodes and the reception node.

Still another exemplary embodiment of the present invention provides a recording medium storing a program for implementing a method for setting sessions, which is performed by a transmission node on a network including the transmission node transmitting data, a reception node receiving the data, and a third node to which the reception node will transmit the data, wherein the method includes: setting initial sessions with the reception node; calculating the number of additional sessions for receiving the data by using a transmission rate from the reception node to the third node; and setting additional sessions as many as the calculated number of additional sessions.

The calculating of the number of additional sessions for receiving the data may be performed by further using at least one of usable transmission/reception bandwidth of the reception node and the third node, transmission/reception quality, and attribute information of the data.

The reception node may receive the data from a plurality of transmission nodes, and the calculating of the number of additional sessions for receiving the data may be performed by further using data transmission information between the plurality of transmission nodes and the reception node.

According to exemplary embodiments of the present invention, a method for setting sessions and a method for transmitting/receiving data using the same can reflect to setting the sessions various and complicated states of the communication network as the configuration of the communication network is more and more complicated.

Further, the sessions can be more effectively set depending on the state of the communication network, so that data is more effectively transmitted/received.

DETAILED DESCRIPTION

Figure 1:
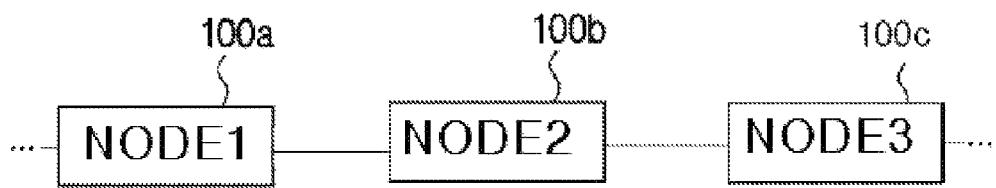
FIG. 1 is a diagram illustrating a configuration of a network system in which a method for setting sessions and a method for transmitting/receiving data using the same according to an exemplary embodiment of the present invention can be performed.

Although the present invention can be modified variously and have several embodiments, specific exemplary embodiments are illustrated in the accompanying drawings and will be described in detail in the detailed description. However, the present invention is not limited to the specific exemplary embodiments and it should be construed that the present invention includes all the modifications, equivalents, and substitutions included in the spirit and scope of the present invention.

Like reference numerals refer to like elements in describing each drawing. Further, in describing the present invention, when it is determined that the detailed description of the known art relating to the present invention may obscure the subject matter of the present invention, the detailed description thereof will be omitted.

Terms such as 'first', 'second', and the like may be used to describe various elements, but the elements should not be limited by the terms. The terms are used only to discriminate one element from other elements.

For example, the first component may be called the second component without departing from the scope of the present invention. Likewise, the second component may be called the first component.

A term 'and/or' includes a combination of a plurality of items relating to the description or any one of a plurality of items relating to the description.

Stated that any elements are "connected" or "coupled" to other components, it is to be understood that the components may be directly connected or coupled to other components, but another component may intervene therebetween.

On the other hand, stated that any components are "directly connected" or "directly coupled" to other components, it is to be understood that there is no another component therebetween.

The terms used in the specification is used to describe only specific exemplary embodiments and is not intended to limit the present invention.

The singular forms include the plural forms unless the context clearly indicates otherwise. It is to be understood that the terms "comprise" or "have" used in this specification is to specify the presence of features, numerals, steps, operations, components, parts, or a combination thereof, which are described in the specification, but do not preclude a possibility of the presence or addition of one or more other features, numerals, steps, operations, components, parts, or a combination thereof.

Unless defined otherwise, all the terms used in the specification including technical and scientific terms have the same meaning as those that are generally understood by a person with ordinary skill in the art to which the present invention pertains.

It should be construed that the terms defined in the dictionary, which are generally used, have the meaning matching the meaning of the context of the related art, and the terms should not be construed as an ideally or excessively formal meaning unless clearly defined in the specification.

Hereinafter, exemplary embodiments of the present invention will be described in detail with reference to the accompanying drawings, however, like reference numerals refer to like or corresponding elements regardless of reference numerals and a detailed description thereof will be omitted.

First, referring to FIGS. 1 and 2, a configuration of a network system in which a method for setting sessions and a method for transmitting/receiving using the same according to an exemplary embodiment of the present invention can be performed will be described.

Figure 2:
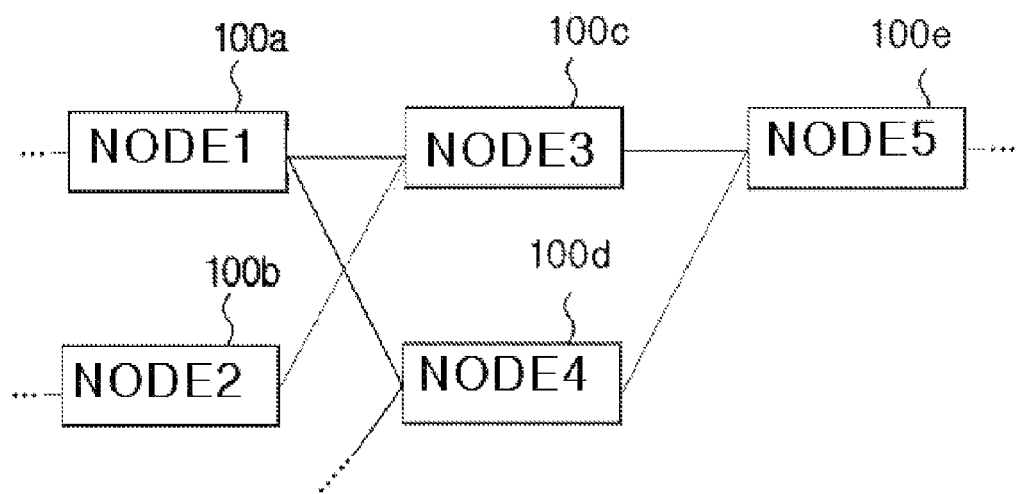
FIG. 2 is a diagram illustrating another configuration of a network system in which the method for setting sessions and the method for transmitting/receiving data using the same according to the exemplary embodiment of the present invention can be performed.

FIGS. 1 and 2 are diagrams illustrating a configuration of a network system in which a method for setting sessions and a method for transmitting/receiving data using the same according to an exemplary embodiment of the present invention can be performed.

As shown in FIGS. 1 and 2, the network system is constituted by nodes 100a, 100b, 100c, . . . which are respective elements constituting a network, that is, apparatuses.

Meanwhile, in an example of FIG. 1, connections among the respective nodes 100a, 100b, 100c, . . . , for example, network states among the respective nodes such as a connection between node 1 100a and node 2 100b and a connection between node 2 100b and node 3 100c may be all different.

For example, the connection between node 1 100a and node 2 100b may be a connection through the Internet which is a representative public communication network and the connection between node 2 100b and node 3 100c may be a connection through a dedicated network.

Even if the connection between node 1 100a and node 2 100b and the connection between node 2 100b and node 3 100c are both the connections through the Internet, a transmission rate of data among the nodes, that is, a data transmission/reception rate varies depending on a type of a line or the performance of the node and the amount of data transmitted and received among the nodes.

Node 1 100a and node 2 100b are positioned at regions which are geographically close to each other, but node 2 100b and node 3 100c may be positioned geographically remotely from each other.

The type of the node, for example, the respective nodes may also be various, such as a server providing data or a client receiving data, or in the middle, an intermediate apparatus such as a router or a switch that relays transmission of data through transmission/reception of data.

Meanwhile, a following description will be made on the assumption that a transmission node transmitting data is set as a first node 100a, a node receiving data and transmitting the received data to a third node 3 100c again is set as a second node 100b, and a node receiving data from the second node 100b is set as the third node 100c with reference to the example of FIG. 1, for ease of description.

In the method for setting the sessions among the nodes in the related art, as described above, data was transmitted and received by setting only the predetermined number of sessions among the nodes, for example, one or a predetermined plurality of sessions in most cases.

However, in the session setting method in the related art, network resources may be wasted or data cannot be effectively transmitted.

For example, when data is transmitted by setting the plurality of sessions even though data having a small data size is transmitted, the network resources are wasted and when data is transmitted by setting one session even though data having a large data size is transmitted, data cannot be efficiently transmitted.

When data is transmitted by setting the plurality of sessions between the transmission node 100a and the reception node 100b even though the received data need not be rapidly transmitted to the third node 100c which is another node, the network resources are wasted and when data is transmitted by setting only one session even though the received data needs to be rapidly transmitted to the third node 100c, data is efficiently transmitted.

In particular, as shown in FIG. 2, as the network and the configuration are more complicated, data is inefficiently transmitted and received according to the predetermined number of sessions.

In the present invention, in order to solve the problem in setting the sessions in the related art, the number of sessions between nodes is variably determined by considering attribute information of data and a condition of a node that will transmit the received data again and data is transmitted and received by additionally setting the sessions depending on the determined number of sessions, thereby transmitting data more efficiently.

Hereinafter, referring to FIG. 3, a method for setting sessions and a method for transmitting/receiving data using the same according to the exemplary embodiment of the present invention will be described.

Figure 3:
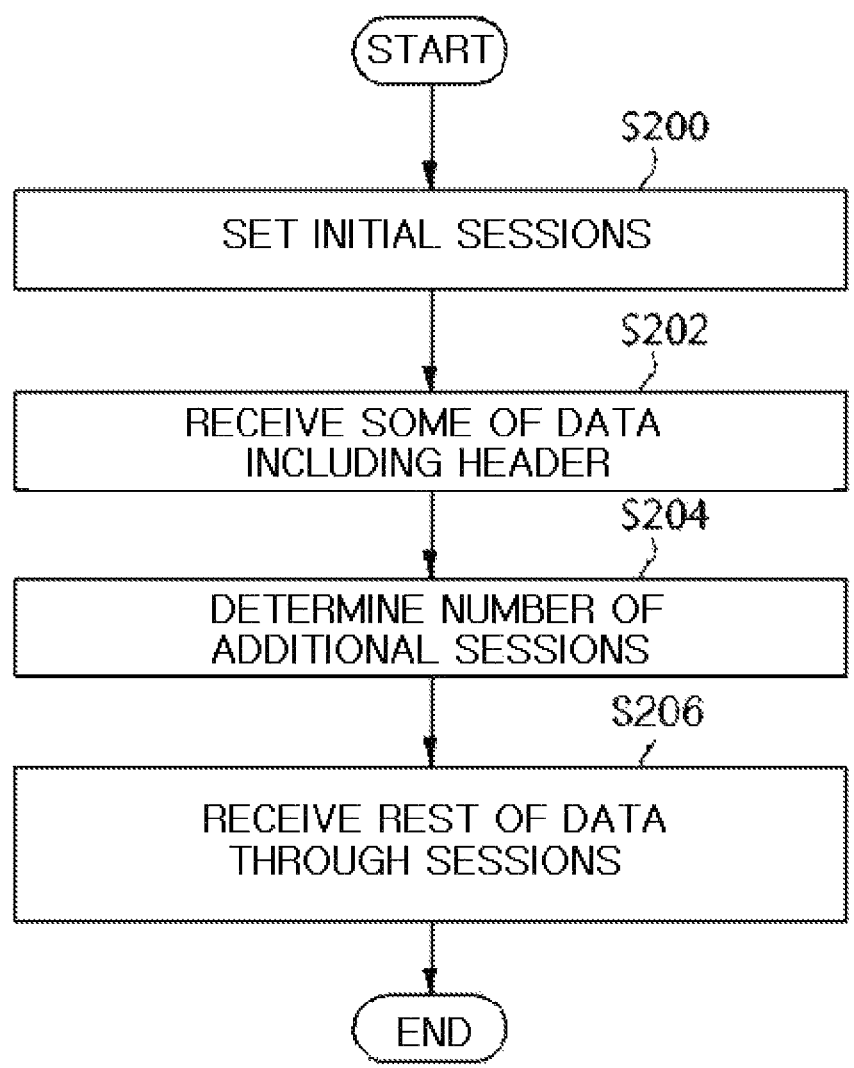
FIG. 3 is a diagram showing a sequence in which the method for setting sessions and the method for transmitting/receiving data using the same according to the exemplary embodiment of the present invention are performed.

FIG. 3 is a diagram showing a sequence in which the method for setting sessions and the method for transmitting/receiving data using the same according to the exemplary embodiment of the present invention are performed.

As shown in FIG. 3, in the method for transmitting/receiving data using the method for setting sessions according to the exemplary embodiment of the present invention, first, an initial session is set between the transmission node 100a transmitting data and the reception node 100b receiving the data (S200).

Some of the data to be received, which include a header are received through the set initial session (S202).

Meanwhile, the received header may include attribute information of the data which the reception node 100b will receive.

The header may include the attribute information of the data to be received, e.g., data attribute information which are various pieces of information associated with data, such as the size of the data, a data type information regarding whether the data is image data or moving picture data, data classification information regarding whether the data is movie data or education data, and a data service method regarding whether a service method is a streaming scheme or a download scheme.

Since the data attribute information is generally stored in a header part of data, the header in some of the data is received in FIG. 3, but it is apparent that not the header but only the attribute information of data can be first received through the initial session when the data attribute information is not included in the header.

Meanwhile, as a method for partitioning some of the data transmitted through the initial session into packets, a method for partitioning file addresses of all the content files as large as a predetermined offset based on the file address may be used, but the method for partitioning some of the data is not limited thereto.

When the transmitted data is data such as streaming media data, all the data are not transmitted at a time, and as a result, all the data may not be transmitted at a time.

When the transmitted data is the data such as the streaming media data, how rapidly contents are first reproduced from the time when an end user requests the contents may be a very important service performance evaluation factor. In other words, the reason is that it may be judged that the user's perception satisfaction is high when a first reproduction rate is rapid.

The end user highly frequently determines whether to continuously use the contents while viewing an initial reproduction area of the streaming media data.

Accordingly, in the present invention, when the end user determines to continuously use the contents, data regarding the rest of contents which have not been yet transmitted is transmitted to the user through an additional session setting process, and on the contrary, when the end user does not continuously use the contents and stops using the contents, the initial session may be terminated and the additional session may not be set.

It is also possible to increase an end user's sensing speed to a transmission rate by transmitting more data through the initial session.

For example, the amount of data which is initially transmitted is increased by allocating a wideband to the initial session, using a more excellent compression technique, or using a more excellent encryption technique to transmit data more effectively.

When a situation of the end user is reflected in determining the additional session, unnecessary session setting and data transmission can be prevented, such that the network resources can be saved more effectively.

When the reception node partitions one datum to receive some of the partitioned data from a plurality of nodes, respectively, the number of additional sessions may be determined by further considering data transmission information which is all information associated with transmission of the data of which is presently transmitted, such as a transmission rate of the data received from the plurality of nodes, information on the part of the partitioned data, and data transmission bandwidth information.

Meanwhile, when some of the data are received through the initial session, the reception node 100b included in the received header calculates and determines the number of sessions to be additionally set according to attribute information of data to be received (S204).

Calculating and determining the number of sessions to be additionally set will be described by illustrating the case of using size information of data in the attribute information of data.

For example, all 100 MB of data should be transmitted and 10 MB of data are received through the initial session when a bandwidth of 10 MB can be set between the transmission node 100a and the reception node 100b and thus, 90 MB of data which is the rest of the data may be set to be received at a time by additionally setting eight sessions having the bandwidth of 10 MB in order to receive the 90 MB of data which is the rest of the data.

Of course, the number of added sessions may be set by considering a node user's set-up or the bandwidth between the nodes.

Bandwidths set for the respective sessions may be set to be different from each other to receive the rest of the data.

The number of additional sessions may be determined according to data transmission/reception quality information between the nodes.

As the data transmission/reception quality information, various pieces of information capable of evaluating a degree of data transmission/reception, such as a transmission/reception rate of data, a failure degree of the network between the nodes, a fail-over time of the network, traffic, and quality of service (QoS), may be used.

Meanwhile, although not shown in FIG. 3, calculating and determining the number of sessions to be additionally set may be achieved by considering a transmission rate to a node 100c (hereinafter, referred to as a 'third node' for ease of description) that will transmit data which the reception node 100*b* receives again, as well as the attribute information of data.

As described above, when the data received by the reception node 100*b* should be transmitted to the third node 100*c* again, even though data is rapidly transmitted only between the transmission node 100*a* and the reception node 100*b*, actual transmission of data is not rapidly performed on the network when the reception node 100*b* does not rapidly transmit data to the third node 100*c*.

For example, when it is assumed that the first node 100*a* is a server, the third node 100*c* is a client, and the second node 100*b* is a server that relays data, data is rapidly transmitted from the first node 100*a* to the second node 100*b*, but when the client as the actual end user receives data late, the object to rapidly transmit data cannot be achieved.

Accordingly, in determining the number of additional sessions between node 1 100*a* and node 2 100*b*, data may be more rapidly transmitted between node 1 100*a* and node 2 100*b* by further considering the transmission rate between node 2 100*b* and the third node 100*c*.

Meanwhile, the number of additional sessions between the first node 100*a* and the second node 100*b* may be determined by further considering, as between the first node 100*a* and the second node 100*b*, attribute information of data to be transmitted from the second node 100*b* to the third node 100*c*, a bandwidth between the second node 100*b* and the third node 100*c*, and a transmission quality between the second node 100*b* and the third node 100*c* as well as the transmission rate between the second node 100*b* and the third node 100*c* in determining the number of additional sessions between the first node 100*a* and the second node 100*b*.

As shown in FIG. 2, like node 3 100*c* or node 5 100*e*, when one node is connected to a plurality of nodes to receive, from the respective nodes, different parts by partitioning the same data, respectively, the number of additional sessions may be determined by considering a reception rate or bandwidth from the plurality of nodes that receive data.

Even when the number of nodes to which the reception node will transmit data again is plural, the number of additional sessions may be determined by considering a transmission rate to each of the plurality of nodes and a network state.

Meanwhile, when the number of additional sessions between the transmission node 100*a* and the reception node 100*b* is determined, the additional sessions are set and the rest of the data are received through the set additional sessions (S206).

Meanwhile, in the case of the set additional sessions, the session may be set to have various bandwidths or transmission rates according to the network states.

For example, when a large amount of data are transmitted through the initial sessions as described above, the rest of the data may be transmitted while the bandwidths of the additional sessions are smaller than the bandwidths of the initial sessions.

Data may be transmitted by differentiating the bandwidths of the respective additional sessions or the bandwidth may be variably allocated such as allocating much more bandwidths according to the network states after large bandwidths are not allocated.

Meanwhile, although the reception node 100*b* has been primarily described in the above description, the transmission node 100*a* receives information on the calculated number of additional sessions from the reception node 100*b* to set the additional sessions with the reception node 100*b* according to the received information on the number of additional sessions.

The number of additional sessions may be calculated by not the reception node 100*b* but the transmission node 100*a* to set the additional sessions through communication between the transmission node 100*a* and the reception node 100*b*.

In this case, even the transmission node 100*a* may calculate the number of additional sessions by using the size information of the data to be transmitted and may calculate the number of additional sessions by further using the attribute information of data, the transmission bandwidth of data, and the transmission/reception quality information.

When the number of additional sessions is calculated by further using the transmission rate, the data transmission bandwidth, and the transmission quality information between the reception node 100*b* and the third node 100*c*, the transmission rate, the data transmission bandwidth, and the transmission/reception quality information between the reception node 100*b* and the third node 100*c* may be received from the reception node 100*b* through the initial sessions.

The method for setting sessions and the method for transmitting data using the same according to the exemplary embodiments of the present invention may be implemented by programs to be stored in computer-readable media (a CD-ROM, a RAM, a floppy disk, a hard disk, and an optical magnetic disk).

Hereinafter, referring to FIG. 4, a configuration of a data transmitting/receiving apparatus using a method for setting sessions according to an exemplary embodiment of the present invention will be described.

Figure 4:
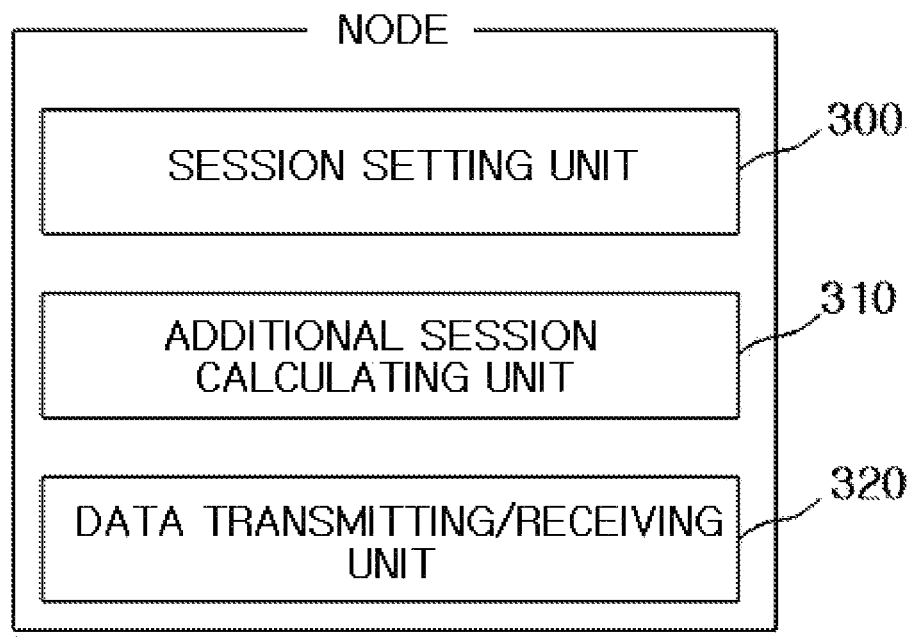
FIG. 4 is a diagram illustrating a configuration of a data transmitting/receiving apparatus using a method for setting sessions according to an exemplary embodiment of the present invention.

FIG. 4 is a diagram illustrating a configuration of a data transmitting/receiving apparatus using a method for setting sessions according to an exemplary embodiment of the present invention.

As shown in FIG. 4, the data transmitting/receiving apparatus using the method for setting sessions according to the exemplary embodiment of the present invention, i.e., a node may include a session setting unit 300, an additional session calculating unit 310, and a data transmitting/receiving unit 320.

The session setting unit 300 sets sessions between the transmission node 100*a* transmitting data and the reception node 100*b*.

As the sessions set by the session setting unit 300, additional sessions additionally set according to the number of additional sessions calculated by the additional session calculating unit 310 after the initial sessions are set are also set as well as the initial sessions.

The additional session calculating unit 310 calculates the number of additional sessions which are additionally set.

The number of additional sessions may be calculated by using the attribute information of data to be transmitted as described above.

The number of additional sessions may be calculated by considering the data transmission rate from the reception node to the third node.

The number of additional sessions may be calculated by additionally considering the attribute of the data, the bandwidths of the transmission node 100*a* and the reception node 100*b*, the transmission quality, and the transmission rate between the third node 100*c* and the reception node 100*b* that will receive data again.

The data transmitting/receiving unit 320 transmits/receives data through the initial sessions and the additional sessions.

Meanwhile, in FIG. 4, the node which is a data transmitting/receiving apparatus has been primarily described, but only the additional session calculating unit 310 calculating the number of additional sessions may also be configured as a separate apparatus and connected with the node to set the additional sessions.

It is apparent that a program in which the method for setting sessions according to the exemplary embodiment of the present invention is implemented may be implemented in a form installed in a digital apparatus that transmits or receives data.

The exemplary embodiments of the present invention are disclosed for the purpose of illustration and various modifications, changes, and additions can be made within the spirit and scope of the present invention by those skilled in the art and it should be appreciated that the modifications, changes, and additions are included in the appended claims.

What is claimed is:

1. A method for setting sessions, which is performed by a reception node on a network including a plurality of transmission nodes transmitting data and the reception node receiving the data, the method comprising:
   receiving at least some of the data including attribute information of the data through initial sessions;
   calculating a number of additional sessions for receiving the data by using the attribute information of the data and data transmission information between the plurality of transmission nodes and the reception node; and
   setting additional sessions as many as the calculated number of additional sessions.

2. The method for setting sessions of claim 1, wherein the attribute information of the data is at least one of a size of the data, a file type of the data, and a service method of the data.

3. The method for setting sessions of claim 1, wherein the calculating of the number of additional sessions for receiving the data is performed by further using at least one of usable transmission/reception bandwidth information of the plurality of transmission nodes and the reception node and transmission/reception quality information.

4. A method for setting sessions, which is performed by a reception node on a network including a plurality of transmission nodes transmitting data, the reception node receiving the data, and a third node to which the reception node will transmit the data, the method comprising:
   receiving at least some of the data through initial sessions;
   calculating a number of additional sessions for receiving the data from the transmission node by using a transmission rate from the reception node to the third node and data transmission information between the plurality of transmission nodes and the reception node; and
   setting additional sessions as many as the calculated number of additional sessions.

5. The method for setting sessions of claim 4, wherein the calculating of the number of additional sessions for receiving the data is performed by further using at least one of usable transmission/reception bandwidth information of the reception node and the third node, transmission/reception quality information, and attribute information of the data.

6. A reception node on a network constituted by a plurality of nodes including a plurality of transmission nodes transmitting data and a reception node receiving the data, comprising:
   a session setting unit setting sessions with the transmission node; and
   a data transmitting/receiving unit transmitting or receiving data through the session set by the session setting unit,
   wherein the data transmitting/receiving unit receives at least some of the data including attribute information of the data through initial sessions set by the session setting unit,
   the reception node further includes an additional session calculating unit calculating a number of additional sessions for receiving the data by using the attribute information of the data received by the data transmitting/receiving unit and data transmission information between the plurality of transmission nodes and the reception node, and
   the session setting unit sets additional sessions with the transmission node as many as the number of additional sessions, which is calculated by the additional session calculating unit.

7. The transmission/reception node of claim 6, wherein the attribute information of the data is at least one of a size of the data, a file type of the data, and a service method of the data.

8. The transmission/reception node of claim 6, wherein the calculating of the number of additional sessions for transmitting or receiving the data in the additional session is performed by further using at least one of usable transmission/reception bandwidth information of the transmission node and the reception node and transmission/reception quality information.

9. A reception node on a network including a plurality of transmission nodes transmitting data, the reception node receiving the data, and a third node to which the reception node will transmit the data, comprising:
   a session setting unit setting sessions with the transmission node; and
   a data transmitting/receiving unit transmitting or receiving data through the session set by the session setting unit,
   wherein the data transmitting/receiving unit receives at least some of the data through initial sessions,
   the reception node further includes an additional session calculating unit calculating a number of additional sessions for receiving the rest of the data from the transmission node by using a transmission rate to the third node and data transmission information between the plurality of transmission nodes and the reception node, and
   the session setting unit sets additional sessions with the transmission node as many as the number of additional sessions, which is calculated by the additional session calculating unit.

10. The transmission/reception node of claim 9, wherein the calculating of the number of additional sessions for transmitting or receiving the data in the additional session calculating unit is performed by further using at least one of usable transmission/reception bandwidth information of the reception node and the third node, transmission/reception quality information, and attribute information of the data.

11. A non-transitory recording medium storing a program for implementing a method for setting sessions, which is performed by a reception node on a network including a plurality of transmission nodes transmitting data and the reception node receiving the data, wherein the method includes:
   receiving at least some of the data including attribute information of the data through initial sessions;
   calculating a number of additional sessions for receiving the data by using the attribute information of the data and data transmission information between the plurality of transmission nodes and the reception node; and
   setting additional sessions as many as the calculated number of additional sessions.

12. A non-transitory recording medium storing a program for implementing a method for setting sessions, which is performed by a reception node on a network including a plurality of transmission nodes transmitting data, the reception node receiving the data, and a third node to which the reception node will transmit the data, wherein the method includes:
- receiving at least some of the data through initial sessions;
- calculating a number of additional sessions for receiving the data from the transmission node by using a transmission rate from the reception node to the third node and data transmission information between the plurality of transmission nodes and the reception node; and
- setting additional sessions as many as the calculated number of additional sessions.

* * * * *